United States Patent
Turner et al.

(10) Patent No.: US 7,610,501 B2
(45) Date of Patent: Oct. 27, 2009

(54) ARRANGEMENT FOR THE POWER SUPPLY FOR A SECURITY DOMAIN OF A DEVICE

(75) Inventors: Olaf Turner, Berlin (DE); Dirk Rosenau, Berlin (DE); Torsten Schlaaff, Zepernick (DE)

(73) Assignee: Francotyp-Postalia AG & Co. KG (DE)

( * ) Notice: Subject to any disclaimer, the term of this patent is extended or adjusted under 35 U.S.C. 154(b) by 1112 days.

(21) Appl. No.: 10/007,899

(22) Filed: Nov. 5, 2001

(65) Prior Publication Data
US 2002/0073349 A1 Jun. 13, 2002

(51) Int. Cl.
*G06F 1/26* (2006.01)
(52) U.S. Cl. ........................... 713/340; 713/300
(58) Field of Classification Search .......... 713/340, 713/300
See application file for complete search history.

(56) References Cited

U.S. PATENT DOCUMENTS

| | | | |
|---|---|---|---|
| 4,628,457 A | | 12/1986 | Manduley |
| 5,039,580 A | * | 8/1991 | Mori et al. ............ 429/97 |
| 5,128,552 A | * | 7/1992 | Fang et al. ............ 307/66 |
| 5,283,792 A | * | 2/1994 | Davies et al. ......... 714/22 |
| 5,604,708 A | * | 2/1997 | Helms et al. ......... 365/229 |
| 5,650,974 A | * | 7/1997 | Yoshimura ........... 365/229 |
| 5,933,812 A | * | 8/1999 | Meyer et al. ......... 705/15 |
| 6,073,085 A | * | 6/2000 | Wiley et al. .......... 702/118 |
| 6,594,760 B1 | * | 7/2003 | Ryan et al. ........... 713/189 |

FOREIGN PATENT DOCUMENTS

| | | |
|---|---|---|
| EP | 0 328 062 | 2/1989 |
| EP | 0 527 009 | 7/1992 |
| EP | 1 022 683 | 12/1999 |
| EP | 1 035 518 | 2/2000 |
| WO | WO 99/48055 | 9/1999 |

* cited by examiner

*Primary Examiner*—Tse Chen
(74) *Attorney, Agent, or Firm*—Schiff Hardin LLP

(57) ABSTRACT

In an arrangement for the power supply for a security domain of a device, a first battery is connected to a first input of a battery switchover device in the security region and a second battery is arranged in a non-security region of the device housing and is connected to a second input of the battery switchover device. The battery switchover device is coupled to a monitoring unit in the security region of the device. The monitoring unit is preferably composed of an analog-to-digital converter and a module processor for the evaluation of the connected battery voltages.

12 Claims, 3 Drawing Sheets

ARRANGEMENT FOR THE POWER SUPPLY FOR A SECURITY DOMAIN OF A DEVICE

BACKGROUND OF THE INVENTION

1. Field of the Invention

The present invention is directed to an arrangement for the power supply for a security domain of a device. Such a security domain can be realized in the form of a postal security module that, in particular, is suitable for use in a postage meter machine or a mail processing machine or computer with mail processing function.

2. Description of the Prior Art

A variety of security measures are known for protecting against outages or, respectively, malfunctions of intelligent electronic systems.

European Application 417 447 discloses the use of special modules in electronic data processing systems equipped with means to protect against unauthorized tampering with electronics. Such modules are called security modules below.

Modern postage meter machines or other devices for franking postal items are equipped with a printer for printing the postage stamp on the postal matter, a controller for controlling the printing and the peripheral components of the postage meter machine, an accounting unit for debiting postage fees that are stored in non-volatile memories, and a unit for cryptographically securing the postage fee data. A security module (European Application 789 333) can include a hardware accounting unit and/or the unit for securing the printing of the postage fee data. For example, the former can be realized as application specific integrated circuit (ASIC) and the latter can be realized an OTP (One-Time Programmable) processor. An internal OTP memory stores sensitive data (cryptographic keys) protected against readout; such data being required, for example, for replenishing a credit. Encapsulation by a security housing offers further protection.

Further measures for the protection of a security module against tampering with the data stored therein it are disclosed in German OS 198 16 572 and German OS 198 16 571, German OS 199 12 780 (corresponding to co-pending application Ser. No. 09/522,621, filed Mar. 10, 2000), German OS 199 12 781 (corresponding to co-pending application Ser. No. 09/522,620 filed Mar. 10, 2000) and German Utility Model 299 05 219 U1 (corresponding to co-pending application Ser. No. 09/524,118 filed Mar. 13, 2000)

For example, the security module is plugged onto the motherboard of the meter in the postage meter machine JetMail®. The meter housing is preferably fashioned as a security housing but nonetheless is designed such that the user can see the status display of the security module from the outside through an opening. Applying the system voltage to the module processor of the security module at a sufficient level activates the display in order to be able to read the module status. Whether the security module is operational or out of service thus can be determined. Even when the security module is functioning, a signal can be emitted when a service technician should be called or when a restart of the system is implemented. The security module can assume various statuses in its life cycle that, however, are displayed only in the operating status of the meter, i.e. when system voltage is present at the security module. Otherwise, the battery of the security module would be quickly drained. The service life of the battery should be appropriate for the life cycle and be as long as possible. Postal register data, cryptographic keys and other sensitive data must be preserved and the real-time clock must also continue to run when the postage meter machine is turned off, given power interruptions or outage of the system voltage. Also circuit elements for permanent monitoring functions must continue to run without interruption. The need for available battery current rises as a result, with the consequence that the service life of the battery is decreased.

According to German OS 199 12 780, a replaceable battery was therefore arranged on the security module. Of course, this battery can only be replaced when system voltage is present. A voltage monitoring unit with resettable self-holding detects a voltage outage or a drop of the voltage below a prescribed threshold. Brief-duration outages of the battery voltage lasting fractions of a second also lead to the immediate blocking of the security module and the postage meter machine thus becomes unusable.

Heretofore, the batteries have been accommodated directly on the printed circuit board of the postage meter machine computer or of the security module. This means that the postally secured part of the postage meter machine must be opened for changing batteries. In many countries, the machine must be unsealed at the post office for this purpose and must then be resealed after the battery has been changed. The security module of the postage meter machine JetMail® is accessible only when the meter housing is destroyed. This procedure is even difficult for a service technician or not possible at all on site. The meter must be returned to the manufacturer and the user needs a replacement machine with a different security module. This causes considerable outlay when, for example, a battery replacement is implemented at time intervals of 5 years. Even the duration of 5 years can be realized only with large and expensive lithium batteries for the security module. A lengthening of the service life to, preferably, 12 years would be desirable.

SUMMARY OF THE INVENTION

An object of the present invention is to increase the life span of data stored battery-supported in a security domain of a device. A further object is to allow replenishing of the battery capacity for a security domain of a device with minimal outlay, and maximum protection against a manipulation of the stored data should thereby be guaranteed. The arrangement should be employable, for example, in postage meter machines, to which special security demands apply with respect to the postal register data since, in particular, the fiscal accounting data must be impossible to manipulate.

The above object is achieved in accordance with the invention in an electronic device having a security region containing a first battery, which supplies power to security components in the security region, and which is connected to a first input of a battery switchover device, also located in the security region. A second battery is disposed in the device outside of the security region and is connected to a second input of the battery switchover device. A monitoring unit monitors voltage information relating at least to the second battery and activates the battery switchover device.

The provision of a battery compartment in a non-security region of the device housing in combination with a battery switchover device and a monitoring unit offers protection against incorrect polarization, oxidation of the battery contact posts and protection against non-insertion of a second battery in the implementation of a battery replacement. By taking over the supply of the power-consuming components, the second battery lengthens the service life of the first battery. Since battery replacement can be undertaken by a user of the device, the service life of the security module can be significantly increased without requiring the unit to be returned to the manufacturer. Protection against manipulation of the stored data is guaranteed because the provision of the battery compartment does not compromise the security region of the device housing. Using diodes or controlled electronic switches, the battery switchover device decouples at least two batteries or battery sets for supplying the security module. The monitoring unit is composed of an analog-to-digital converter connected to the battery switchover device and a module processor for evaluating the battery voltages. An existing display unit of the device or a signaling unit of the security also module can be employed for signaling the battery condition. The battery switchover device and the monitoring unit are preferably components of the security module.

DESCRIPTION OF THE PREFERRED EMBODIMENTS

Figure 1:
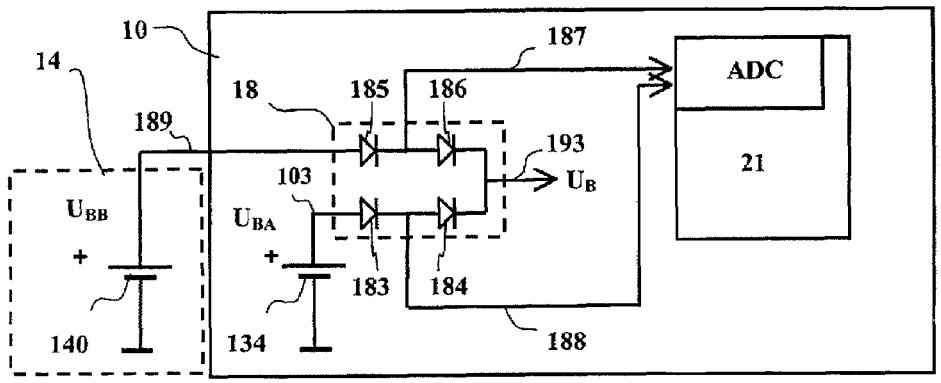
FIG. 1 is a circuit diagram for the power supply for a security domain in accordance with the invention.

FIG. 1 shows an arrangement for the power supply for a security domain of a device. The device, for example a mail processing unit, a postage meter machine or a computer, has a security region 10 and at least one non-security region 14. A first battery 134 in the security region ensures an emergency power supply of components (not shown) given outage of the main power supply, a second battery 140 serves as an auxiliary power supply. The first battery 134—for example a 3 V lithium battery of the type CR ½ AA CD of the Varta company—has a nominal voltage $U_{BA}$. The second battery 140 is replaceably arranged in the non-security region 140 and has a nominal voltage $U_{BB}$. The two batteries are decoupled from one another via a battery switchover device 18 and are interconnected such that the higher battery voltage is present at the output thereof, whereby $U_B=U_{BB}$ if $U_{BA}<U_{BB}$ and $U_B=U_{BA}$ if $U_{BA}>U_{BB}$. The output-side voltage $U_B$ serves for the supply of the monitoring unit 21 and further components in the security region 10. For example, the second battery 140 is a lithium battery of the type SL-360 of Sonnenschein Lithium GmbH. Via the line 189, its positive pole is connected to one of the two inputs of the battery switchover device 18. The first battery 134 has its positive pole 103 connected to the other of the two inputs of the battery switchover device 18. With $U_{BB}=3.6$ V, thus, the second battery has a somewhat higher voltage than the first battery 134 ($U_{BA}=3$ V). The output of the battery switchover device 18 applies the battery voltage $U_B=U_{BB}-U_V$ to components (not shown) in the security region 10. The voltage $U_V$ represents drops at the diodes/switches. The first battery 134 is directly located in the security region 10 of the device, for example of a postage meter machine, that is not accessible to the user. At least a part of the security region 10 can be fashioned as a security module. Differing from the replaceable battery according to German OS 199 12 780, the first battery 134 can be firmly soldered on the security module and serves as emergency battery and can be relatively small and inexpensive. The retention time given exclusive supply by this battery 134 can be on the order of one year; however, the storage time of this battery 134 must be ≧10 years. This battery 134 can already be connected during the production process to the security module/component in need of battery voltage in order to enable the storage of information therein (initialization).

In a first embodiment, a first series circuit of Schottky diodes 183, 184 and a second series circuit of Schottky diodes 185, 186 are respectively connected between the first and second inputs of the battery switchover device 18 and the output of the battery switchover device 18. The output of the battery switchover device 18 lies on a line 193. The voltage drop across one of the Schottky diodes of the battery switchover device 18 typically lies between 100 and 200 mV. Advantageously, the battery switchover device 18 can be a component of the security module.

The respective center taps 187, 188 of the first and second series circuit of Schottky diodes of the battery switchover device 18 are connected to inputs of an analog-to-digital converter of a monitoring unit 21. The latter can likewise be a component of the security module. The security module preferably has a module processor with the analog-to-digital converter, integrated therein, as explained in greater detail on the basis of FIG. 4. Alternatively in a way that is not shown, a digital-to-analog converter can apply a reference value to an input of a comparator. The comparator can compare an actual value thereto that is supplied to a second input of the comparator from the center tap 187.

In a second embodiment (not shown), a plurality of field effect switches or at least one controlled switch of some other type that are controlled by a logic lie between the first and second inputs of the battery switchover device 18 and its output. The voltage drop across the field effect switches lies between 50 and 100 mV.

In a third embodiment (not shown), the diodes 185, 183 or controlled switches lie in the negative path of the batteries.

Figure 2:
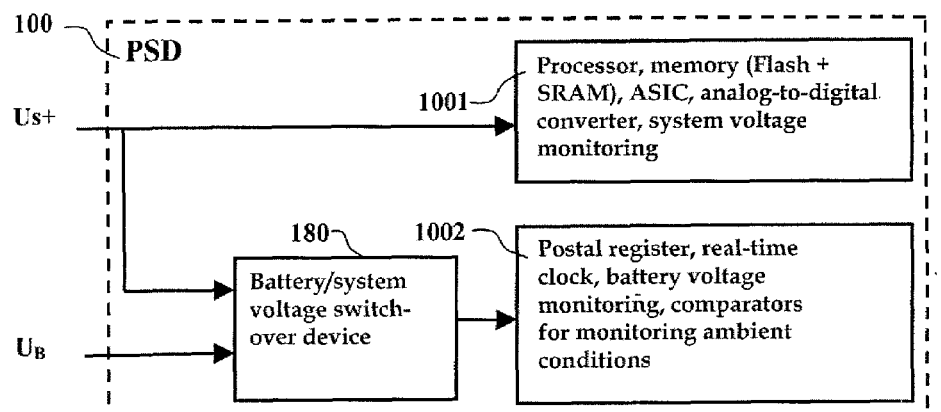
FIG. 2 is a block diagram of the power supply within a postal security device in accordance with the invention.

FIG. 2 shows an illustration of the power supply within a postal security device independently of the embodiment of the battery switchover device 18. At its output side, the battery switchover device 18 (which itself is not shown) supplies a battery voltage $U_B$ of approximately 2.6 through 3.2 V. A system voltage $U_S+$ of approximately 3.3. V is present at the components of a first supply region and at a first input of a battery/system voltage switchover device 180. The battery voltage $U_B$ is present at the second input thereof. The output of the battery/system voltage switchover device 180 supplies a voltage to the components of a second supply region 1002, which include postal registers, the real-time clock, and a unit for monitoring the battery voltage and for monitoring ambient conditions (for example, temperature). The components of the first supply region 1001 are the processor of the postal security module PSD, memories (flash and SRAM), an application specific circuit ASIC, and analog-to-digital converter and a unit that monitors the system voltage. It is expedient to provide an electronic battery voltage monitoring unit. This unit can tap a battery voltage either on the busbar 193, i.e. between the switches and the user, or separately for each battery between the battery and switches or—as shown in FIG. 1—preferably at the tap between the switches. The voltage monitoring circuit only has to be activated when the machine is operating. The need for a replacement of the second battery 140 is called to the attention of the user by suitable known means. As a result, the replacement intervals can be adapted to the actual capacity of the second batteries and the second batteries are utilized better. This can expediently ensue with a display unit of the device or signaling means. If the user does not undertake a replacement despite these prompts, the user is ultimately caused to replace the battery due to a change in the operation of the device. If the display/signaling is ignored, the postage meter machine can exhibit a specific behavior, possibly following a delay period. For example, the processor of the PSD can be programmed to block the device after a delay period when the required replacement of at least the second battery 140 is not performed.

Figure 3:
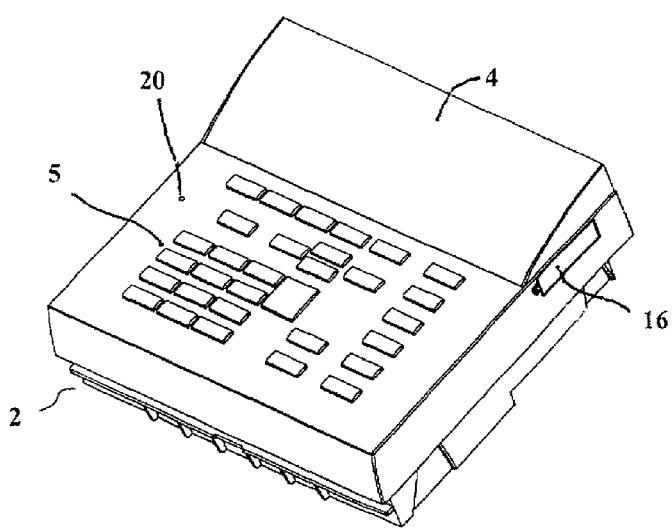
FIG. 3 is a perspective view from the front of a first embodiment of a postage meter machine in accordance with the invention.

FIG. 3 shows a perspective view of the postage meter machine from the front. The postage meter machine JetMail® is composed of a meter and a base (not shown). At its upper side, the meter 2 has a user interface with a display unit 4 and a keyboard, with a signal opening 20 for signaling the statuses of the security module. The security module is plugged onto the motherboard of the meter of the postage meter machine or of some other suitable device that is preferably fashioned as security housing. Advantageously, the meter housing is designed such that the user can see the status display of the security module from the outside through the opening 20, whereby the opening 20 extends up to the user interface of the meter 2. The display/signaling is directly controlled by the internal microprocessor (module processor) of the security module and thus cannot be manipulated from the outside. The display is always active in the operating condition of the postage meter machine, so that the application of the system voltage Us+ to the module processor of the security module suffices for activating the display in order to be able to read the module status. A security region (not shown) that is located inside the meter 2 under the keyboard 5 and is not accessible from the outside, contains the security module PSD and is separated from a non-security region by a sheet metal barrier. A battery compartment that can be closed with a battery flap 16 arranged downstream at a sidewall of the meter 2 in the mail stream is provided in the non-security region.

The second battery can be replaced by a technician and/or user without having to open that part of the postage meter machine that is specially postally secured. The second battery therefore need not be dimensioned for the full service life of the machine, but the aforementioned problems with respect to the battery replacement nevertheless are avoided. The second battery 140 thus is positioned at a location that can be easily reached by technicians and/or user, preferably in the externally accessible battery compartment. Given outage of the system voltage, the components are supplied only by the second battery 140, controlled by the electronic switches or by the voltage amplitude in the case of diodes. The first battery 134 is then purely as reserve for the time the second battery 140 is replaced or in case the latter is drained. In this arrangement, the first battery 134 therefore reaches approximately its maximum service life and need not be changed in the desire time span of approximately 12 years.

Figure 4:
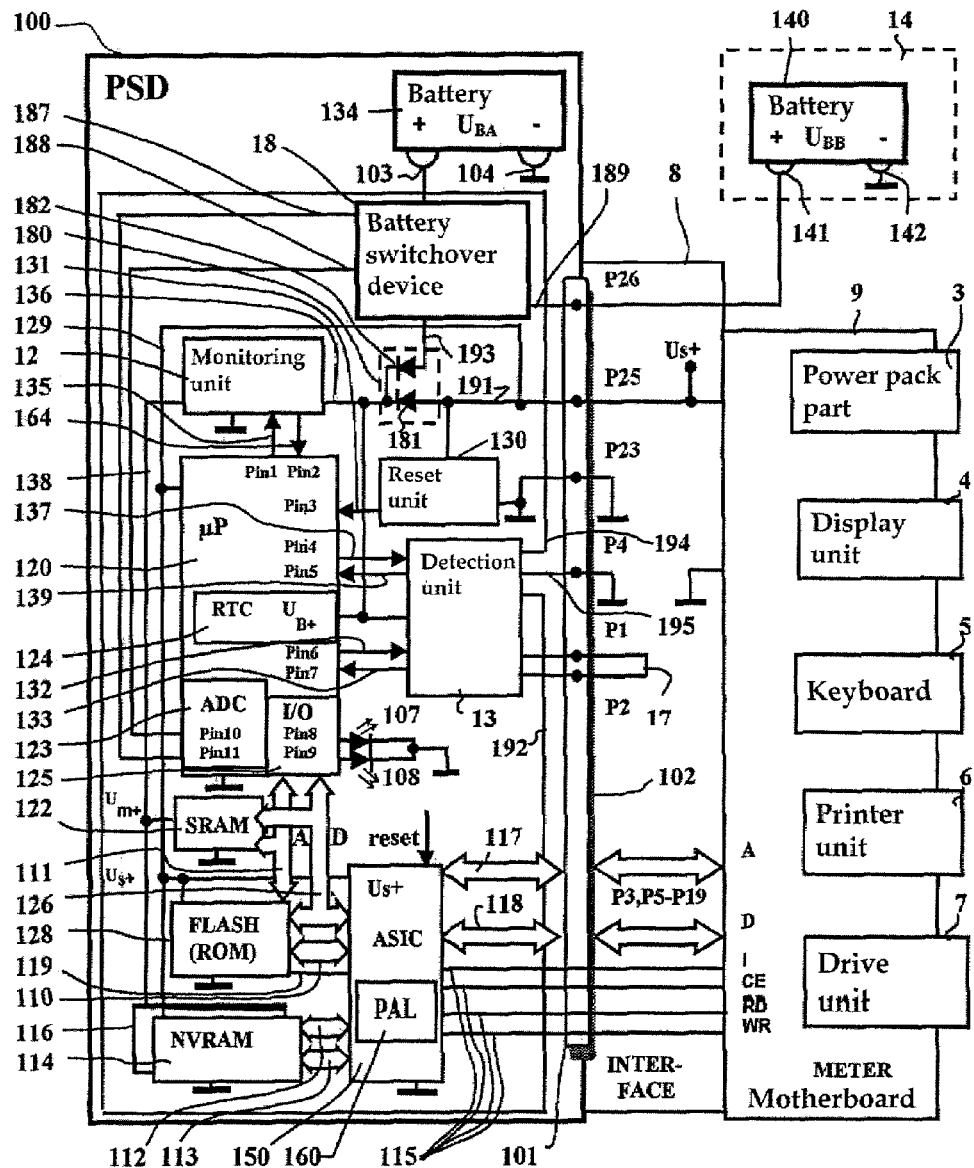
FIG. 4 is block diagram of the security module in a postage meter machine in accordance with the invention.

FIG. 4 shows a block circuit diagram of the postal security module PSD 100 that is interconnected with a postage meter machine in a preferred version. A power pack 3, a display unit 4, a keyboard 5, a printer unit 6 and a drive unit 7 are connected to the meter motherboard 9 of the meter 2 or of a postage meter machine 1. The power pack 3, the display unit 4, the keyboard 5 and the drive unit 7 can be arranged outside a security region. There is at least one non-security region 14 for a second battery 140. Via a system bus 115, 117, 118, via a contact group 101 and via an interface 8, the postal security module PSD 100 has a communication link with the meter motherboard 9 of the meter 2 or of the postage meter machine and is either supplied with a system voltage by the power pack part 3 or with battery voltage by the second battery 140. Via the system bus and, for example, a modem (not shown), the module processor 120 can enter into a communication link with a remote data center (not shown). First and second non-volatile memories are suitably fashioned in the postal security module 100 in order to load a credit and store the postal accounting data in non-volatile memories of different technologies. The accounting is done by the application specific circuit (ASIC) 150 of the postal security module 100. The ASIC 150 contains at least one hardware accounting unit for the calculation of the postal data to be stored. The ASIC 150 is controlled by programmable array logic (PAL) 160. Access logic for the ASIC 150 is accommodated in the PAL 160. An address and control bus 117, 115 from the motherboard of the meter 1 is connected to corresponding pins of the PAL 160, and the PAL 160 generates at least one control signal for the ASIC 150 and a control signal 119 for the program memory FLASH 128. The module processor 120 processes a program that is stored in the FLASH 128. The module processor 120 and the other assemblies such as FLASH 128, ASIC 150 and PAL 160 are connected to one another via an internal module system bus that contains lines 110, 111, 126, 119 for data, address and control signals.

A KS32C41000 processor of Samsung is particularly used as the module processor 120. This internally has a processing unit CPU 121, a real-time clock (RTC) 122, an analog-to-digital converter (ADC) 123 and an input/output unit 125. The module processor 120 of the security module 100 is connected via an internal module databus 126 to the FLASH 128 and to the ASIC 150. The FLASH 128 serves as the program memory and is supplied with system voltage Us+. It is, for example, a 128 Kbyte FLASH memory of the type AM29F010-45EC. Via an internal address bus 111, the module processor 120 of the security module 100 supplies the addresses 0 through 15 to the corresponding address inputs of the FLASH 128 and of a static main memory SRAM 122. Via the contact group 101 of the interface, the ASIC 150 of the security module 100 has a communication connection with the databus 118, with the address bus 117 and with the control bus 115 of the motherboard of the meter 2.

A reset unit 130 is connected via the line 131 to the pin 3 of the module processor 120 and to a pin of the ASIC 150. When the system voltage drops, the module processor 120 and the ASIC 150 are reset by a reset generation in the reset unit 130. In the idle times outside normal operation, the first battery 134 or the second battery 140 supplies the real-time clock 122 with the date/time of day registers and supplies the static main memory SRAM 124 that contains security-relevant data.

The negative pole of the first battery 134 is connected to ground and to a pin P23 of the contact group 101. The positive pole of the first battery 134 is connected to the first input of the battery switchover device 18. The output of the battery switchover device 18 is connected via the line 193 to one input of the voltage switchover device 180. A pin P25 of the contact group 101 that carries the system voltage is connected via a line 191 to the other input of the voltage switchover device 180. The positive pole of the second battery 140 is connected to the pin P26 of the contact group 101 and is connected to the second input of the battery switchover device 18. When the second battery 140 is designed for a higher nominal voltage than the first battery 134, Schottky diodes suffice for the decoupling; otherwise, controlled switches must be utilized in the battery switchover device 18. The component DS 1314 of Dallas Semiconductor is suitable as the battery switchover device 18. The first battery is, for example, a lithium battery of the type CR ½ AA CD of the Varta company. The nominal capacity thereof is specified as 950 mAh. The service life given optimum operating and storage conditions is limited only by the retention time and the storage time of this battery. Of course, any other 3 V lithium battery with higher capacity is suitable such as, for example, the type SL-389/p according to German OS 199 12 780. The second battery is, for example, a lithium battery of the type SL-360 of Sonnenschein Lithium GmbH. No high demands are made on the retention time and storage time of the second battery. The only important factor is an adequately high capacity for supplying the load when the system voltage is disconnected. A commercially available circuit of the type ADM 8693ARN can be utilized as the voltage switchover device 180.

Via the line 136, the output of the voltage switchover device 180 is connected to a voltage monitoring unit 12, a detection unit 13 and a real-time clock 124 of the microprocessor. The voltage monitoring unit 12 and the detection unit 13 are in communication with the pins 1, 2 and pins 4, 5 of the microprocessor via the lines 135, 164 and 137, 139. The pin P25 of the contact group 101 that carries the system voltage is connected to the supply input of a first memory 114 via a line 129. For example, the memory 114 is a static main memory such as a non-volatile memory (NVRAM) of a first memory technology.

A voltage $U_m+$ that is supplied from the output of the monitoring unit 12 on the line 138 is at the supply input of a static main memory SRAM 122 serving as a main memory and the input of a second non-volatile memory NVRAM 116. When the system voltage is shut off, one of the two battery voltages is present. When the voltage of the battery drops below a certain limit during the battery operation, then the circuit of the monitoring unit 12 connects the feed point for the SRAM to ground, so the voltage at the SRAM then lies at 0 V. This leads causes the SRAM 122 that, for example, contains important cryptographic keys, to be very rapidly erased. At the same time, the supply voltage of the second non-volatile memory NVRAM 16 also drops to zero; however, no data are lost. The second non-volatile memory NVRAM is based on a second technology (shadow RAM). This second technology preferably is a RAM and an EEPROM, whereby the latter automatically accepts the data contents given an outage of the system voltage. The NVRAM 116 of the second technology is connected to the corresponding address and data inputs of the application specific circuit ASIC 150 via an internal address and data bus 112, 113.

The circuit of the voltage monitoring unit 12 is dimensioned so that any drop of the battery voltage on the line 136 below the specified threshold of 2.6 V leads to the response of the circuit 12. Simultaneously with the indication of the under-voltage of the battery, the circuit 12 switches into a self-holding condition in which it also remains given subsequent increase of the voltage. It also supplies a status signal 164. The next time the module is switched on, the module processor 120 can interrogate the status of the circuit (status signal) and conclude therefrom and/or via the evaluation of the contents of the erased memory that the battery voltage has fallow below a specific value in the meantime. The module processor 120 can reset the monitoring circuit 12, i.e. "arm" it. The latter reacts to a control signal on the line 135.

The line 136 at the input of the voltage monitoring unit 12 also supplies a detection unit 13 with operating or battery voltage. The detection unit 13 is connected to a conductor loop 192, 194 that is worked into the housing of the security module and cast out with casting compound (for example, synthetic resin). An attack on the housing (for example, drilling) thus can be detected.

The processor 120 interrogates the status of the detection unit 13 via the line 139, or the detection unit 13 is triggered or reset by the module processor 120 via the line 137. A static check for connection is carried out after the setting. To that end, ground potential that is present at the terminal P4 of the interface 8 of the postal security module PSD 100, and that can only be interrogated when the security module 100 is properly plugged, is interrogated via a line 195. When the security module 100 is plugged, ground potential of the negative pole 104 of the battery 134 of the postal security module 100 is applied to the terminal P23 of the interface 8, and thus can be interrogated by the detection unit 13 at the terminal P4 of the interface via the line 192.

Lines that form a conductor loop 17 only when the security module 100 is plugged, for example in the motherboard of the meter 1, are connected to the pins 6 and 7 of the module processor 120 via the detection unit 13. For dynamic testing as to whether the postal security module 100 is plugged in the motherboard of the meter 1, the module processor 120 applies changing signal levels to the pins 6, 7 at highly irregular time intervals and these are fed back via the loop.

The module processor 120 is equipped with an input/output unit 125 whose terminals, pins 8, 9, serve the purpose of emitting at least one signal for signaling the status of the security module 100. I/O ports of the input/output unit 125 lie at the pins 8 and 9, internal module signal means, for example chromatic light-emitting diodes 107, 108, being connected to these ports. These signal the module status through an opening 109 in the meter housing when the security module 100 is plugged onto the motherboard of the meter 1. The security module 100 can assume various statuses in its life cycle. Thus, for example, the battery status must be detected, as must whether the security module contains valid cryptographic keys. It is also important to discern whether the security module is functioning or broken. The exact nature and number of module statuses is dependent on the functions realized in the security module and on the implementation. For evaluation of the battery voltages, the microprocessor is connected to the battery switchover device 18 via the analog-to-digital converter 123. The analog-to-digital converter 123 supplies the microprocessor with a digital measured value for evaluation of the battery voltages. The microprocessor is connected either directly to the light-emitting diodes 107, 108 or indirectly to a signaling means of the meter (beeper, display unit).

As an output voltage on the line 136, the voltage switchover device 180 forwards one of its input voltages that is higher than the other. When the battery switchover device is constructed with Schottky diodes and the voltage switchover device 180 is simply constructed of diodes 181, 182 and the system voltage is the highest, the diode 182 of the voltage switchover device can be omitted. The battery 140 can be replaced at any time without data loss due to the possibility of automatically feeding the aforementioned circuit with the higher of the three voltages $U_s+$ and $U_{BA}+$ and $U_{BB}+$ dependent on the amplitude of the voltages.

Figure 5:
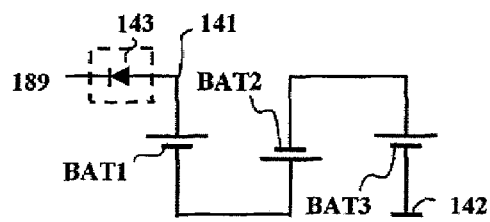
FIG. 5 is a series circuit of batteries with voltage reduction in accordance with the invention.

The second battery 140 can be composed of a series circuit of inexpensive general use batteries BAT1, BAT2, BAT3, for example normal round cells R6 DIN 40863 or R03 DIN 40860 respectively having a nominal voltage of 1.5 V each. The overall voltage of 4.5 V that results is somewhat too high. FIG. 5 therefore shows a battery series circuit with a voltage reduction unit 143. For example, the latter can be a diode (Zener diode or silicon diode) or a regulator.

Figure 6:
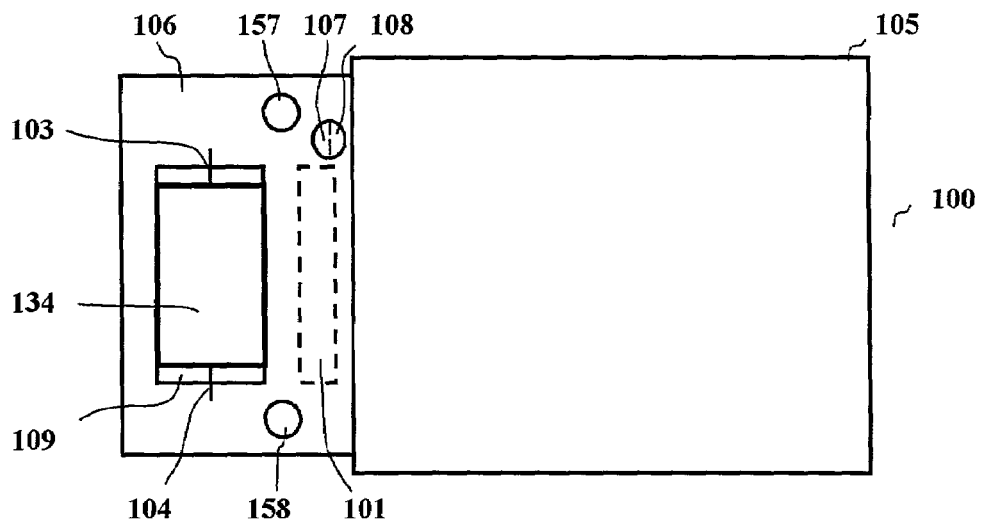
FIG. 6 is a plan view of the security module in accordance with the invention.

FIG. 6 shows the mechanical structure of the security module in plan view. The security module is fashioned as multi-chip module, i.e. a number of function units are interconnected in a first part of a printed circuit board 106. Casting compound 105 surrounds the first part of the printed circuit board 106 in cuboid fashion, whereas a second part of the printed circuit board 106 for the first battery 134 remains free of casting compound. The printed circuit board 106 has an opening 109 for the first battery 134 and solder locations or battery contact posts 103 and 104 for the connection of the poles of the battery 134, preferably under the printed circuit board 106. The contact group 101 (shown with broken lines) is arranged under the printed circuit board 106 (interconnect side) of the security module 100 for plugging the postal security module 100 onto the motherboard of the meter 2.

Figure 7:
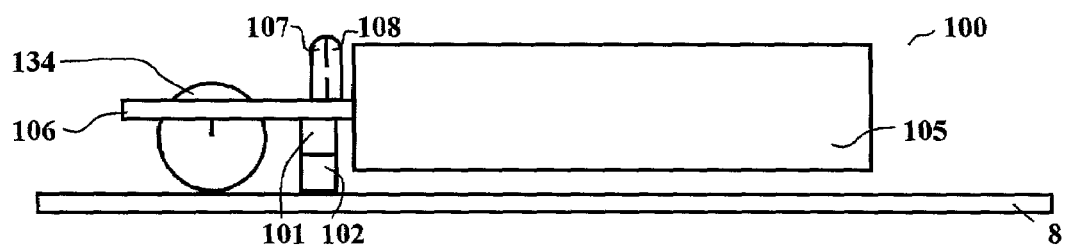
FIG. 7 is a side view of the security module in accordance with the invention.

FIG. 7 shows a side view of the postal security module. When the security module is plugged via interface 8 onto the motherboard, then it can be arranged within the meter housing such that the light-emitting diodes 107, 108 are close to an opening 20 (FIG. 3) or project into the opening. The meter housing is designed such that the user can see the status display of the security module from the outside (FIG. 3). Both light-emitting diodes 107, 108 are accommodated in a common component housing (bicolor light-emitting diode), for which reason the dimensions or the diameter of the opening can be relatively small and lies on the order of magnitude of the light-emitting diode themselves. Three different colors (red, green, orange) can be fundamentally displayed dependent on whether the light-emitting diodes 107, 108 are driven individually or simultaneously. For distinguishing between statuses, the light-emitting diodes 107, 108 are also driven blinking individually or together, possibly blinking in alternation, so that nine different statuses wherein at least one of the two light-emitting diodes 107, 108 is activated can be identified. The module processor undertakes monitoring and signaling of the module status and, in order to preserve the battery, is activated only when the security module is supplied with system voltage. The module processor monitors the hardware-implemented accounting unit, memories and assemblies as well as the first battery 134 in the security region and second battery 140 in the non-security region. The reliable detection of malfunctions or outages or draining of the battery as well as a suitable reaction thereto are the most important factors to be monitored.

Alternatively, the two light-emitting diodes 107 and 108 can be arranged at a location such that they can be viewed only by a service technician, or the two output signals of the I/O ports at the pin 8, 9 of the module processor 120 are communicated via the processor of the motherboard to the display unit 5.

Figure 8:
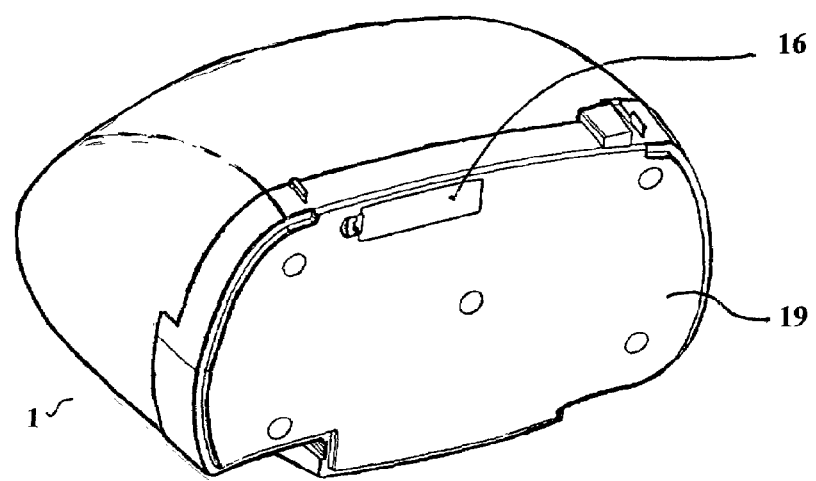
FIG. 8 is a perspective view from below of a second embodiment of a postage meter machine in accordance with the invention.

FIG. 8 shows a perspective view of a further postage meter machine 1 from below, the security module explained in greater detail on the basis of FIGS. 4, 6 and 7 being employed therein. The postage meter machine 1 has a base part 19 with a removable battery compartment cover 16 that closes a battery compartment (not shown) arranged in the non-security region. The battery compartment is provided for the second battery 140. The user interface (covered) has a display unit for signaling the module status and the need to replace the second battery when the module processor evaluates the energy thereof as no longer sufficient for the feed of the security module.

Instead of a removable 3.6 V Li battery, an accumulator or a set of 1.5 V batteries or accumulators in series circuit can also be employed. The batteries or accumulators can be rechargeable.

In addition to electronics in the security region, of course, electronics in the non-security region also can be additionally supplied by the second battery. Components such as battery-supported non-volatile memories (bat-CMOS-RAM) or a second clock module that lie outside the security module can also be co-supplied.

The security module is intended for utilization in postal devices, particularly for utilization in a postage meter machine, however, the security module can also have some other format that enables it to be plugged, for example, onto the motherboard of a personal computer that, as a PC franker, drives a commercially available printer.

Although modifications and changes may be suggested by those skilled in the art, it is the intention of the inventors to embody within the patent warranted hereon all changes and modifications as reasonably and properly come within the scope of their contribution to the art.

We claim as our invention:

1. An electronic device comprising:
    a security region containing a plurality of security components, said security region being surrounded by a mechanical security barrier to normally preclude physical access to said security components;
    a power source adapted for connection to a mains voltage for normally supplying power to said security components;
    a first battery disposed in said security region with physical access to said first battery also being normally precluded in said security barrier;
    a second battery disposed outside of said security region for supplying power to said security components upon an outage of said mains voltage;
    a battery switchover device having a first input connected to said first battery and a second input connected to said second battery and an output, said battery switchover device switching power supply to said security components from said second battery to said first battery only if power from said second battery is absent;
    a monitoring unit disposed in said security region and connected to said battery switchover device, said monitoring unit for evaluating voltage information associated with at least one of a voltage of said first battery and a voltage of said second battery;
    said monitoring unit comprising an analog-to-digital converter that converts said voltage information into digital information, said analog-to-digital converter having a first input and a second input; and
    a first series circuit of Schottky diodes connected between said first input of said battery switchover device and said output, and a second series circuit of Schottky diodes connected between said second input of said battery switchover device and said output, said first series circuit having a center tap connected to said first input of said analog-to-digital converter and said second series circuit having a center tap connected to said second input of said analog-to-digital converter.

2. An electronic device as claimed in claim 1 wherein said monitoring unit comprises a processor supplied with said digital information for evaluating said digital information to generate a signal indicating a supply status representative of said voltage information, and an externally visible indicator connected to said processor for receiving said status signal therefrom and for displaying a visual indication of said supply status.

3. An electronic device as claimed in claim 1 wherein said battery switchover device has an output connected to said security components for supplying power thereto via said battery switchover device from one of said first battery and said second battery, and wherein said device further comprises, in said security region, decoupling elements at said output.

4. An electronic device as claimed in claim 3 wherein said decoupling elements are selected from the group consisting of diodes and controlled electronic switches.

5. An electronic device as claimed in claim 1 further comprising a security module containing said monitoring unit and said security components and protected by said mechanical security barrier.

6. An electronic device as claimed in claim 5 wherein said security module further comprises said battery switchover device.

7. An electronic device as claimed in claim 1 further comprising a battery compartment for said second battery, closeable with a battery compartment cover.

8. An electronic device as claimed in claim 7 having a housing containing said security region and said battery compartment, and having a sidewall in which said battery compartment cover is disposed.

9. An electronic device as claimed in claim 7 having a housing containing said security region and said battery compartment, and having a base in which said battery compartment cover is disposed.

10. An electronic device as claimed in claim 1 further comprising a plurality of operating components, and wherein said monitoring unit includes a processor for evaluating said voltage information, and wherein said processor is connected to at least one of said operating components and alters operation of said at least one of said operating components if said voltage information indicates an unperformed need to replace said second battery.

11. An electronic device as claimed in claim 10 wherein said processor prevents operation of said at least one operating component after a predetermined delay if said voltage information indicates an unperformed need to replace said second battery.

12. An electronic device as claimed in claim 5 wherein said security module is a postal security device.

* * * * *